US012475207B1

(12) United States Patent
Belchee et al.

(10) Patent No.: US 12,475,207 B1
(45) Date of Patent: Nov. 18, 2025

(54) METHODS, APPARATUSES, AND COMPUTER PROGRAM PRODUCTS FOR DYNAMIC TRUST SCORE DETERMINATIONS FOR AUTHENTICATION ACTION REQUESTS

(71) Applicant: Wells Fargo Bank, N.A., San Francisco, CA (US)

(72) Inventors: William Blakely Belchee, Charlotte, NC (US); Bradley Long, Charlotte, NC (US); Matthew N. Wheeler, Charlotte, NC (US); Matthew Brookshire, Salt Lake City, UT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 449 days.

(21) Appl. No.: 18/054,357

(22) Filed: Nov. 10, 2022

Related U.S. Application Data

(60) Provisional application No. 63/282,472, filed on Nov. 23, 2021.

(51) Int. Cl.
*G06F 21/34* (2013.01)
*G06F 21/57* (2013.01)

(52) U.S. Cl.
CPC ............ *G06F 21/34* (2013.01); *G06F 21/577* (2013.01); *G06F 2221/034* (2013.01)

(58) Field of Classification Search
CPC ........ G06F 21/31; G06F 21/34; G06F 21/577; G06F 2221/034; G06Q 20/409; H04W 12/06; H04L 63/10; H04L 63/08
See application file for complete search history.

(56) References Cited

U.S. PATENT DOCUMENTS

| | | | |
|---|---|---|---|
| 2019/0068604 A1* | 2/2019 | Legault | G06F 21/316 |
| 2019/0319945 A1* | 10/2019 | Levy | H04L 63/205 |
| 2020/0293684 A1* | 9/2020 | Harris | H04W 12/02 |

* cited by examiner

*Primary Examiner* — Paul E Callahan
(74) *Attorney, Agent, or Firm* — K&L Gates LLP

(57) ABSTRACT

Methods, apparatuses, and computer program products are provided for dynamically determining a trust score for an authentication action request. An example method includes receiving an authentication action request from a user device. The method further includes determining a device trust score associated with the user device and generating an action trust score for the authentication action request based at least in part on the device trust score. The method further includes providing an authentication action response to the user device based at least in part on the trust score for the authentication request. The authentication action request metadata may include one or more of event data, user device information, location data, user biometric information, user device interaction information.

20 Claims, 14 Drawing Sheets

| Data Element | Data |
|---|---|
| Event Name | "USERID_LOGIN" |
| Event Time Stamp | "2021-06-23T02:55:19.201Z" |
| Event Status | "SUCCESS" |
| Origin | "enroll" |
| UserName (Temp or Perm) | "SeveralXXXX" |
| XAID | "51099XXXX" |
| ECN | "3204527235XXXX" |
| Originating Device Type | "phone" |
| Device IP | "159.45.65.50" |
| IP info | "107.77.253.31" |
| WFA cookie | "382021062513163111119660XXX" |
| SIMS cookie | "1624652824939_0d068fda-7249-4f54-9a85-aef01cd5b4d8" |
| Auth cookie | "93d5f411-f811-4fd5-851d-04b72d5ab101" |
| Proxy Client IP | "159.45.65.50" |
| User Agent | "mozilla/5.0 (iphone; CPU iphone OS 14_6 like Mac OS X) AppleWebKit/605.1.15 (KHTML, like Gecko) Mobile/15E148 WFAppId/905480 WFexperience/phone WFVersion/3.290.5_PROD WFAppName/iphoneApp WFInternalVersion/2.21050000" |
| Native app | "Android" |
| Native App Version | "12.7.1.12" |
| WF App ID | "652420" |
| OS Version | "10" |
| OS Name | "Android" |
| Manufacturer | "LG" |
| Model | "LGLM-Q730" |
| Model Number | "LM-Q730" |

*FIG. 5A*

| Data Element | Data |
|---|---|
| Carrier | "T-Mobile" |
| App Store | "Apple App Store" |
| Camera Enabled | True |
| WF Wallet Enabled | False |
| Authenticator Used | Null |
| Email Validation | Yes |
| Browser Fingerprint | "":"03-22d67c15-EMPTY-cc3f87a0-4ef76a74-44a2a6db-ee33b14e" |
| Transaction Result | "Failure" |
| Shape Shifter ID | "":"350E3BE4" |
| Shape Browser Fingerprint | "03-41484cb9-EMPTY-edf94399-54dd27c9-3753b19e-44d27cde" |
| NuData Device User ID | "wcs-8FH1aiC1xAwWQpJ9qtZfKQxx"" |
| NuData Interdiction Type | "NuCaptcha" |
| NuData Interdiction Type Response | "CaptchaCorrect" |
| NuData FingerPrint ID | "d1-b1c6a92293f101d3" |

Create New Password - Identification

For your security, please complete one field below to confirm your identity and continue.

Tell Us About Yourself
Enter one of the following:

Username ⓘ
[_____]

OR

Social Security number (SSN) or
Individual Tax Identification Number (ITIN) ⓘ
[___-__-____]

[ Continue ]

[ Cancel ]

Create Your New Password

Enter a new password for your account.

Your username
mattbrookshire

Your new password must use:
✓ 8 to 32 characters
✓ At least 1 letter and 1 number
✓ Fewer than 9 numbers Don't use:
✓ Repeating patterns (aaaa, 1111, 1234, abcd)
✓ Frequently used words or phrases* (football, newyork, iloveyou) *We'll check this as you confirm your password.

Use a unique password not used anywhere else.

Best Practices for Stronger Passwords

Enter new password
[_____]

Confirm new password
[_____]

METHODS, APPARATUSES, AND COMPUTER PROGRAM PRODUCTS FOR DYNAMIC TRUST SCORE DETERMINATIONS FOR AUTHENTICATION ACTION REQUESTS

CROSS REFERENCE TO RELATED APPLICATIONS

The present application claims the benefit of U.S. Provisional Application No. 63/282,472, filed Nov. 23, 2021, which is hereby incorporated by reference in its entirety.

TECHNOLOGICAL FIELD

Example embodiments of the present disclosure relate generally to device authentication and, more particularly, to the dynamic determinations of trust scores for authentication action requests.

BACKGROUND

Authentication requests may originate from user devices and may request one or more actions, events, operations, and/or the like from a receiving computing entity (e.g., central server or the like). Such authentication requests may be evaluated prior to executing the one or more corresponding requested actions to ensure that the authentication action request isn't fraudulent in nature. Conventional systems for authentication, however, are inefficient and may result in false positives for fraudulent action requests and/or may prompt a user for additional authorization operations resulting in decreased user satisfaction and/or increased transactional costs associated with the authentication process.

BRIEF SUMMARY

Methods, apparatuses, and computer program products are provided for dynamic trust score determinations for authentication action requests. An example computer-implemented method may include receiving, from a user device, an authentication action request, wherein the authentication action request include an authentication action request type of a plurality of candidate authentication action request types, authentication action request metadata, and a user identifier. The method may include determining, using one or more processors and based at least in part on the authentication action request metadata, a device trust score associated with the user device associated with the authentication action request and may include generating, using the one or more processors and an action trust score machine learning model, a trust score for the authentication action request based at least in part on the device trust score. The method may further include providing an authentication action response to the user device based at least in part on the trust score for the authentication action request, wherein the authentication action response includes at least an indication of whether the authentication action request was successful.

In some embodiments, the method may further include updating, using the one or more processors and a device trust score machine learning model, the device trust score for the user device associated with the authentication action request, wherein the device trust score is based at least in part on the trust score for the authentication action request and authentication action request metadata.

In some embodiments, the method may further include determining, using the one or more processors, an authentication action flow data object for the authentication action request based at least in part on the trust score for the authentication action and the authentication action request type corresponding to the authentication action request and performing, using the one or more processors, one or more operations based at least in part on the authentication action flow data object.

In determining the device trust score associated with the user device associated with the authentication action request, the method may further include querying, using the one or more processors, a user profile database to retrieve a user profile identified by the user identifier; and querying, using the one or more processors, the user profile for a device identifier that matches the user identifier associated with the user device requesting the authentication action request, wherein (i) in an instance a matching user device identifier is found, selecting the associated device trust score for the matching user device and (ii) in an instance a matching user device identifier is not found, generating a device trust score for the user device.

In other embodiments, in generating the trust score for the authentication action request based at least in part on the device trust score, the method may further include comparing, using the one or more processors, the authentication action request metadata to one or more attribute values stored of one or more corresponding attribute profiles associated with a user profile described by the user identifier, wherein the trust score is based at least in part on the similarity between the authentication action request metadata and one or more attribute values of the one or more attribute profiles.

In some embodiments, generating the trust score for the authentication action request is based at least in part on historical trust scores associated with the particular device.

In some embodiments, the authentication action request metadata includes one or more of event data, user device information, location data, user biometric information, user device interaction information.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIGS. 5A-5B illustrate operational examples of authentication action request metadata in accordance with some example embodiments described herein.

FIGS. 12A-12F illustrate operational examples of a set of actions corresponding to an authentication action flow data object in accordance with some example embodiments described herein.

DETAILED DESCRIPTION

Figure 1:
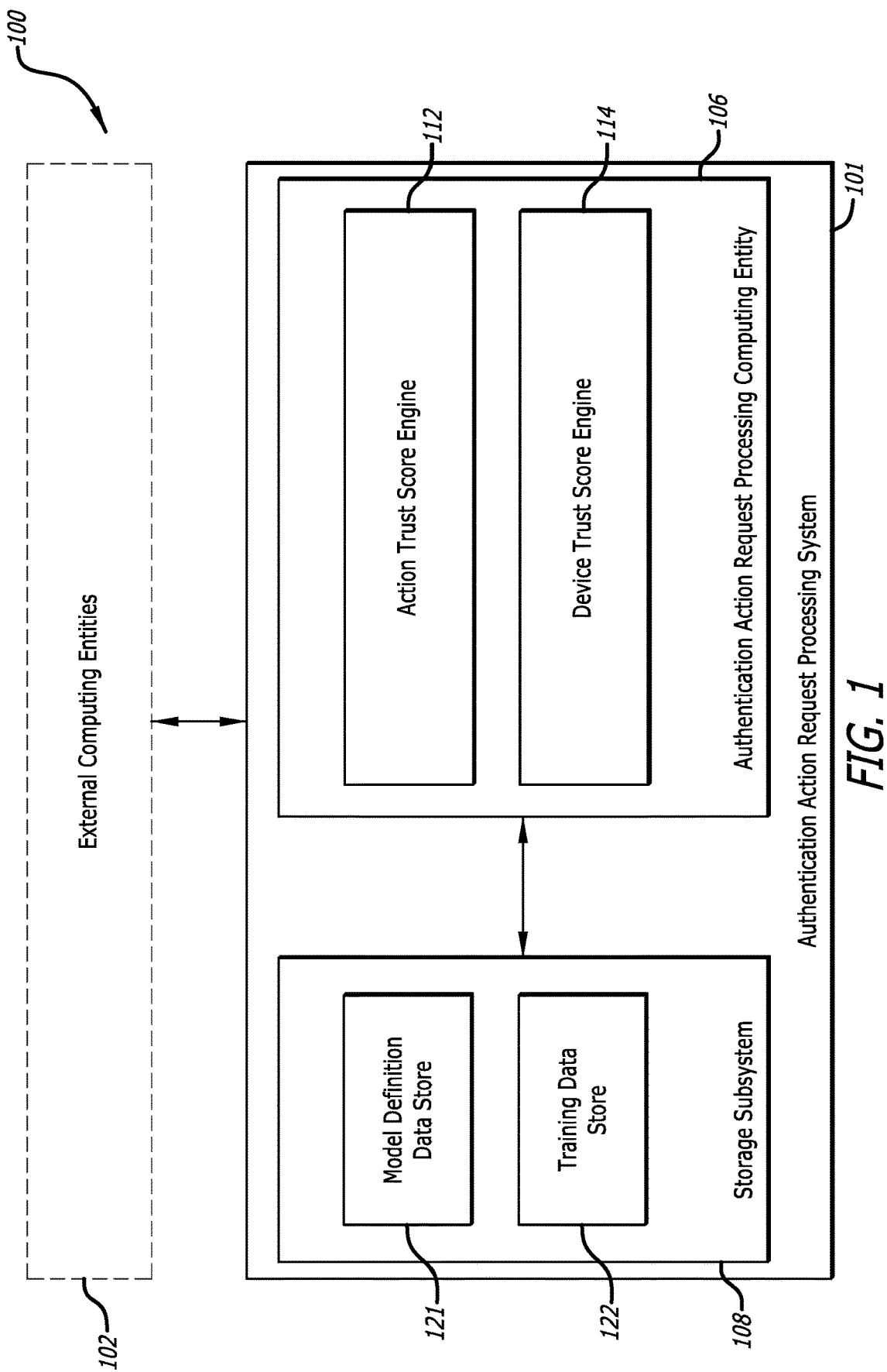
FIG. 1 illustrates an exemplary overview of a system that may be used to practice embodiments of the present disclosure.

Some embodiments of the present disclosure will now be described more fully hereinafter with reference to the accompanying drawings, in which some, but not all embodiments of the disclosure are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout. As used herein, the description may refer to authentication action request processing system or computing entity as an example "apparatus." However, elements of the apparatus described herein may be equally applicable to the claimed computer-implemented method and computer program product. Thus, use of any such terms should not be taken to limit the spirit and scope of embodiments of the present disclosure.

Definition of Certain Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

As used herein, the terms "user device," "mobile device," "electronic device" and the like refer to computer hardware that is configured (either physically or by the execution of software) to access one or more services made available by a real-time payment server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), wired or wireless headphones, fitness trackers, and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the authentication action request processing computing entity 106 or other computing devices via a network. In some embodiments, the user device may be configured to communicate directly with an example computing device (e.g., an authentication action request processing computing entity 106) of the present disclosure via networking connectivity provided by the respective user device. In other embodiments, the user device may rely upon network connectivity provided by another user device in order to communicate with an example computing device (e.g., an authentication action request processing computing entity 106) of the present disclosure.

As used herein, the term "authentication action request" may refer to an electronically received data object associated with a request from a user to perform one or more events, services, actions, functions, and/or the like associated with, for example, a corresponding user account. Each authentication action request may correspond to an authentication action request type from amongst a plurality of candidate authentication action request types. For example, candidate authentication action request types may include a request to login to a user account, a request to transfer funds to and/or from one or more financial accounts, a request to change a password associated with a user account, a request to open a new account for the user, a request to check the status of one or more financial accounts, and/or the like. In some embodiments, the authentication action request may include authentication action metadata and a user identifier. The user identifier may be any identifier which identifies a user associated with the authentication action request. For example, a user identifier may include a username, account number, phone number, email address, customer identifier, and/or the like. The authentication action request metadata may include one or more attributes describing or associated with any data of the requesting user, user device, and/or authentication request. For example, the authentication action request metadata may detail attributes including one or more of event data, user device information, location data, user biometric data, user device interaction information, and/or the like.

As used herein, the term "authentication action response" may refer to an electronically generated data object configured to provide an indication of whether an authentication action request was successful. The authentication action response may be generated and/or provided in response to receipt of an authentication action request from a user device. In some embodiments, the authentication action response may further include instructions for providing and/or completing one or more next steps, operations, functions, and/or the like associated with the authentication action request. In some embodiments, the one or more next steps may be defined based at least in part on an authentication action flow.

As used herein, the term "authentication action flow data object" may refer to an electronically stored data object configured to provide one or more operations corresponding to a particular authentication action request type. In some embodiments, the authentication action flow data object may detail or otherwise comprise a decision tree model that may be used to determine one or more actions based at least in part on a device trust score for a requesting user device and/or trust score for a particular authentication action request. The authentication action flow data object may define a root-level node which is associated with a corresponding authentication action request type. Each decision tree segment may be associated with a particular device trust score and/or trust score for the authentication action request. Each leaf-level node of the decision tree object may be associated with a particular set of actions corresponding to the authentication action request type of a plurality of candidate sets of actions.

The term "action trust score machine learning model" may refer to an electronically-stored data construct that is configured to detail parameters, hyper-parameters, and/or stored operations of a machine learning model that is configured to generate a trust score for a received authentication action request. In some embodiments, the action trust score machine learning model may be configured to process a device trust score and/or authentication action request to generate a trust score for the authentication action request. In some embodiments, the action trust score machine learning model may be configured to generate the trust score for the authentication action request based at least in part on the device trust score, authentication action request metadata, historical authentication action request metadata associated with a user profile and/or other user data stored within the associated user profile. In some embodiments, a trust score may be any numeric value. In some embodiments, the action trust score machine learning model may be configured to determine one or more trust score classifications for the trust score. The trust score classifications categories may include, but are not limited to, a high trust classification, a medium trust classification, and a low trust classification. Each classification category may be defined by one or more trust score values. For example, a low trust classification category may be defined by trust score values between 0-20, a medium trust classification category may be defined by trust score values between 21-80, and a high trust classification category may be defined by trust score values between 81-100. The present disclosure contemplates that any thresholds, groupings, clusters, etc. may be used for the trust score classification categories described herein based upon the intended application of the associated system.

In some embodiments, the action trust score machine learning model may employ any suitable clustering algorithms including but not limited to affinity propagation, agglomerative clustering, balanced iterative reducing and clustering using hierarchies (BIRCH), density-based spatial clustering of applications with noise (DBSCAN), k-means, mini-batch k-means, mean shift, ordering points to identify cluster structure (OPTICS), spectral clustering, mixture of Gaussians, and/or the like. In some embodiments, the action trust score machine learning model may cluster one or more authentication action request metadata attributes with one or more historical authentication action request metadata attributes. In some embodiments, the trust score may be based at least in part on inter-cluster distance between two or more clusters for a particular metadata attribute. For example, one cluster may correspond to a current keystroke pattern and another cluster may correspond to a historical average keystroke pattern, wherein the historical average keystroke pattern is the averaged keystroke pattern based at least in part on one or more historical authentication action requests. Additionally or alternatively, one cluster may correspond to a current keystroke pattern and one or more clusters may correspond to one or more historic keystroke patterns each corresponding to a particular historical authentication action request. In such an embodiment, the trust score may be based at least in part on the inter-cluster distance between each of the cluster associated with the current authentication action request and the one or more clusters associated with the one or more historic authentication action requests. In some embodiments, each inter-cluster score for one or more attributes of the authentication action request may be used to generate the trust score. In some embodiments, the action trust score machine learning model may be further configured to determine weights for each of the inter-cluster scores to generate the trust score for the authentication action request. In some embodiments, the one or more action trust score machine learning models may be trained to determine or to otherwise derive an optimal configuration and/or to optimize one or more associated hyper-parameters. In some embodiments, the parameters and/or hyper-parameters of the action trust score machine learning generation model may be represented as one or more values, such as in an array. The present disclosure contemplates that the action trust score machine learning model may encompass any machine learning, artificial intelligence, or clustering technique and may similarly perform any machine learning technique.

The term "device trust score machine learning model" may refer to an electronically-stored data construct that is configured to describe parameters, hyper-parameters, and/or stored operations of a machine learning generation model that is configured to generate a device trust score for each user device associated with a user profile. In some embodiments, the action trust score machine learning model may be configured to generate a device trust score based at least in part on authentication action request metadata and/or user data stored within the associated user profile. In some embodiments, the device trust score machine learning model may be configured to periodically, semi-periodically, and/or in response to receiving an authentication action request, update a device trust score for a user device. The device trust score may be updated based at least in part on a trust score for a received authentication action request, corresponding authentication action request metadata, historical trust scores for authentication action requests, and/or historical authentication action request metadata. In some embodiments, a device trust score may be any numeric value. In some embodiments, the device trust score machine learning model may be configured to determine one or more device trust score classifications for the device trust score. The device trust score classifications categories may include, but are not limited to, a high device trust classification, a medium device trust classification, and a low device trust classification. Each classification category may be defined by one or more device trust scores. For example, a low device trust classification category may be defined by device trust scores between 0-20, a medium device trust classification category may be defined by device trust scores between 21-80, and a high device trust classification category may be defined by trust device scores between 81-100. In some embodiments, the device trust score machine learning model may be configured to initialize a device trust score to an initial device trust score value. The device trust score machine learning model may also be configured to modify the device trust score for the particular device in response to one or more authentication events, such as via email, short message service (SMS) message, phone call etc. The amount the device trust score is modified by may be a predetermined amount (e.g., 10 points for an affirmative email authentication event). Alternatively, the amount the device trust score is modified by may be determined automatically by the device trust score machine learning model. In some embodiments, the action trust score machine learning model may be further configured to update the device trust score based at least in part on a trust score for the corresponding authentication action request and/or authentication action request metadata.

In some embodiments, the device trust score machine learning model may also employ any suitable clustering algorithms including but not limited to affinity propagation, agglomerative clustering, balanced iterative reducing and clustering using hierarchies (BIRCH), density-based spatial clustering of applications with noise (DBSCAN), k-means, mini-batch k-means, mean shift, ordering points to identify cluster structure (OPTICS), spectral clustering, mixture of Gaussians, and/or the like. In some embodiments, the device trust score machine learning model may cluster one or more authentication action request metadata device attributes with one or more historical authentication action request metadata device attributes. In some embodiments, the device trust score may be based at least in part on inter-cluster distance between two or more clusters for a particular metadata device attribute. For example, one cluster may correspond to a location and one or more clusters may correspond to one or more historic location each corresponding to a particular historical authentication action request. In such an embodiment, the device trust score may be based at least in part on the inter-cluster distance between each of the cluster associated with the current authentication action request and the one or more clusters associated with the one or more historic authentication action requests. In some embodiments, each inter-cluster score for one or more device attributes of the authentication action request may be used to generate the device trust score. In some embodiments, the device trust score machine learning model may be further configured to determine weights for each of the inter-cluster scores to generate the device trust score for the authentication action request. In some embodiments, the one or more device trust score machine learning models may be trained to determine or to otherwise derive an optimal configuration and/or to optimize one or more associated hyper-parameters. In some embodiments, the parameters and/or hyper-parameters of the device trust score machine learning generation model may be represented as one or more values, such as in an array. The present disclosure contemplates that the device trust score machine learning model may encompass any machine learning, artificial intelligence, or clustering technique and may similarly perform any machine learning technique.

Computer Program Products, Methods, and Computing Entities

Embodiments of the present disclosure may be implemented in various ways, including as computer program products. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Framework

FIG. 1 is a schematic diagram of an example system architecture 100 for receiving authentication action requests and determining authentication action responses. The system architecture 100 includes an authentication action request processing system 101 including an authentication action request processing computing entity 106 configured to process an authentication action request and provide an authentication action response. The authentication action request processing system 101 may, in some embodiments, communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The system architecture 100 includes a storage subsystem 108 configured to store at least a portion of the data utilized by the authentication action request processing system 101. The authentication action request processing computing entity 106 may also be in communication with one or more external computing entities 102. In some embodiments, the authentication action request processing computing entity 106 may be configured to train one or more processing models (e.g., an action trust score machine learning model, device trust score machine learning model, etc.) based at least in part on the training data store 122 stored in the storage subsystem 108 and store the one or more trained processing models as part of the model definition data store 121 stored in the storage subsystem 108. The storage subsystem 108 may be configured to store the model definition data store 121 used to store the definition of one or more processing models and the training data store 122 used to train one or more processing models. The authentication action request processing computing entity 106 may be configured to receive authentication action requests and/or data from external computing entities 102, process the authentication action requests and/or data to generate an action trust score for the authentication action requests, and/or provide one or more authentication action responses to the external computing entities 102. Although illustrated in FIG. 1 as separate components, the present disclosure contemplates that, in some embodiments, the authentication action request processing system 101 and/or the authentication action request processing computing entity 106 may comprise the external computing entities 102, in whole or in part.

The storage subsystem 108 may be configured to store at least a portion of the data utilized by the authentication action request processing computing entity 106 to perform authentication action steps/operations and tasks. The storage subsystem 108 may be configured to store at least a portion of operational data and/or operational configuration data including operational instructions and parameters utilized by the authentication action request processing computing entity 106 to perform steps/operations in response to one or more authentication action requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The authentication action request processing computing entity 106 includes an action trust score engine 112 and a device trust score engine 114. The action trust score engine 112 may be configured with circuitry and/or computer program code to execute and/or operate one or more action trust score machine learning models to generate one or more action trust scores for one or more authentication action requests based a corresponding device trust score. The device trust score engine 114 may be configured with circuitry and/or computer program code to execute and/or operate one or more device trust score machine learning models to generate and/or update a device trust score for one or more user devices based at least in part on one or more historical device trust scores associated with the user device, authentication action request metadata, and/or the like.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the authentication action request processing computing entity 106 may provide or supplement the functionality of particular circuitry. The one or more action trust score machine learning models and/or device trust score machine learning models may be stored in the storage subsystem 108 and/or in the model definition data store 121 or may be otherwise accessible by respective engines 112 and/or 114.

Exemplary Authentication Action Request Processing Computing Entity

Figure 2:
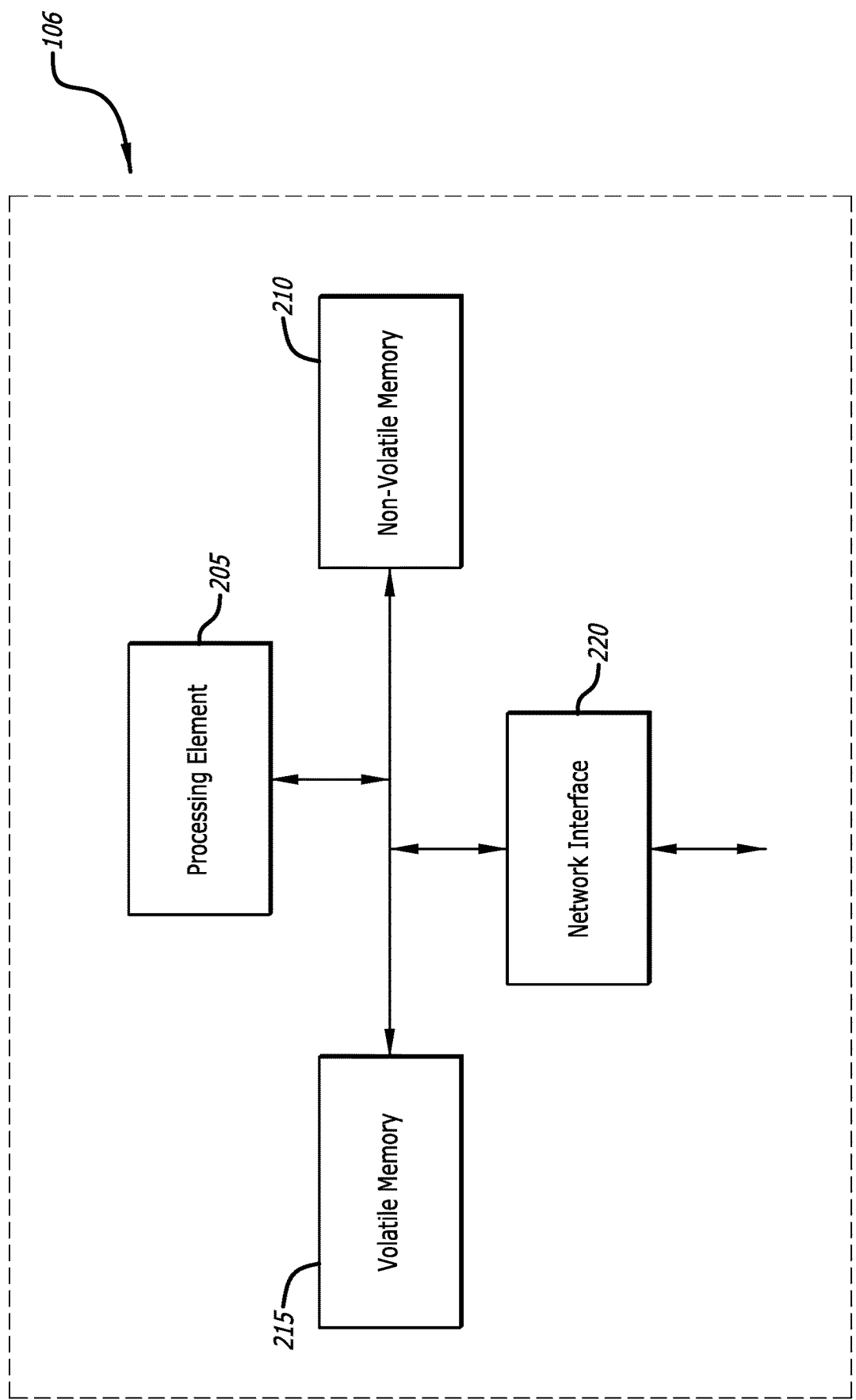
FIG. 2 illustrates an example authentication action request processing computing entity in accordance with some embodiments discussed herein.

FIG. 2 provides an example schematic of an authentication action request processing computing entity 106 according to one embodiment of the present disclosure. In general, the terms computing entity, computer, entity, device, system, controller, computing device, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes may be performed on data, content, information, and/or similar terms used herein interchangeably.

As indicated, in one embodiment, the authentication action request processing computing entity 106 may also include a network interface 220 for communicating with various computing entities, such as by communicating data, content, information, and/or similar terms used herein interchangeably that may be transmitted, received, operated on, processed, displayed, stored, and/or the like. In some embodiments, the network interface may be configured to access a network via Bluetooth, NFC, Wi-Fi, 3G, 4G, 5G, RFID protocols, and the like. By way of a particular example, the network interface 220 may configured to communicate with the authentication action request processing system 101 or computing entity or other computing device via a network.

As shown in FIG. 2, in one embodiment, the authentication action request processing computing entity 106 may include or be in communication with a processing element 205 (also referred to as processors, processing circuitry, and/or similar terms used herein interchangeably) that communicate with other elements within the authentication action request processing computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media 215, 210 or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the authentication action request processing computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the authentication action request processing computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the authentication action request processing computing entity 106 with the assistance of the processing element 205 and operating system.

As indicated, in one embodiment, the authentication action request processing computing entity 106 may also include a network interface 220 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the authentication action request processing computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, 4G, 5G, and/or any other wireless protocol.

Although not shown, the authentication action request processing computing entity 106 may include or be in communication with one or more input elements, such as a keyboard input, a mouse input, a touch screen/display input, motion input, movement input, audio input, pointing device input, joystick input, keypad input, and/or the like. The authentication action request processing computing entity 106 may also include or be in communication with one or more output elements (not shown), such as audio output, video output, screen/display output, motion output, movement output, and/or the like. By way of example, the authentication action request processing computing entity 106 may be, via the network interface 220, be configured to cause generation/presentation of a user interface displaying authentication action responses as described hereafter.

Exemplary External Computing Entity

Figure 3:
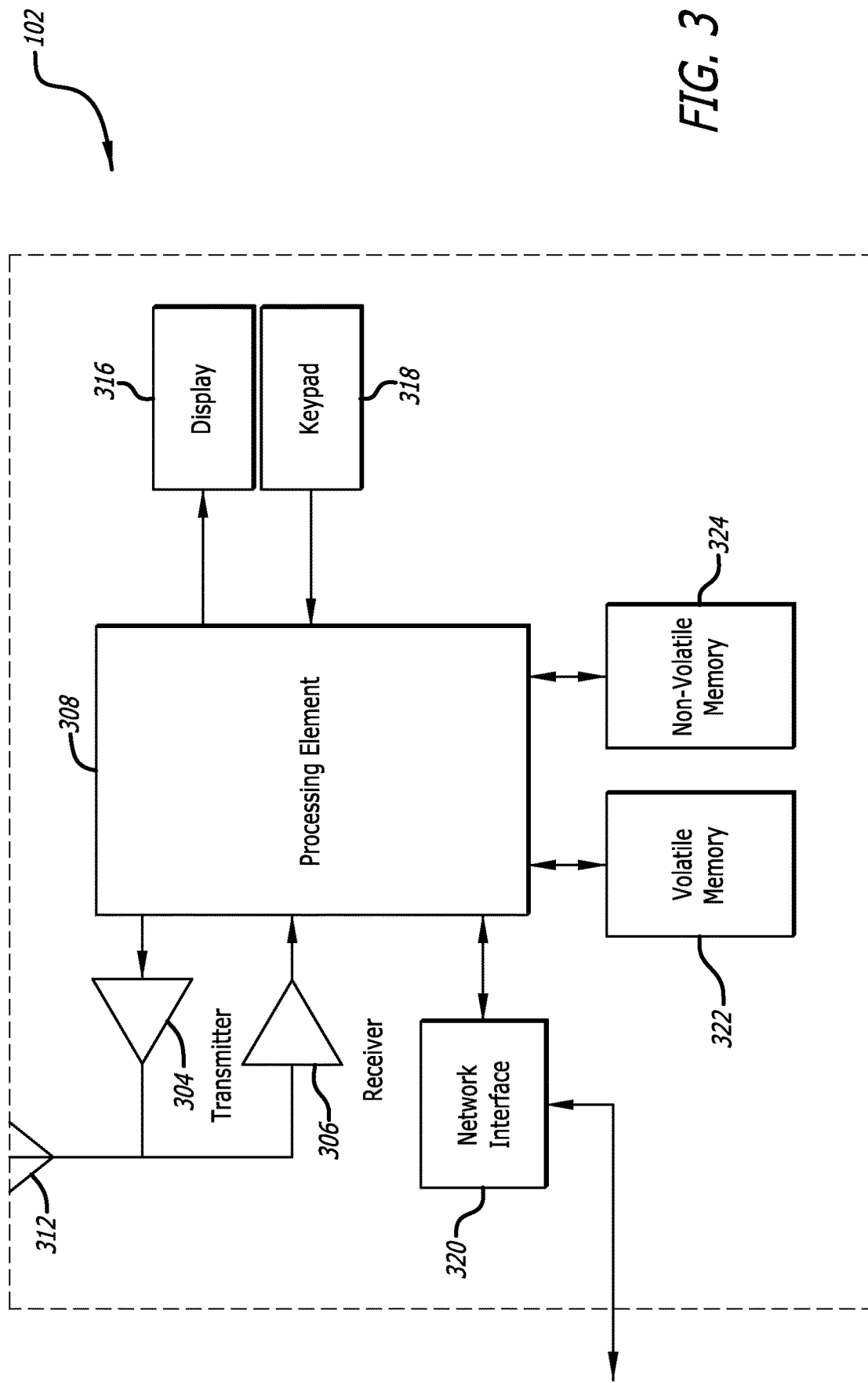
FIG. 3 illustrates an example external computing entity in accordance with some embodiments discussed herein.

FIG. 3 provides an illustrative schematic representative of an external computing entity 102 that may be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 may be operated by various parties. As shown in FIG. 3, the external computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the authentication action request processing computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, 4G, 5G, and/or the like. Similarly, the external computing entity 102 may operate in accordance with multiple wired communication standards and protocols, such as those described above with regard to the authentication action request processing computing entity 106 via a network interface 320.

Via these communication standards and protocols, the external computing entity 102 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 may also download changes, add-ons, and updates, for instance, to its firmware, software (e.g., including executable instructions, applications, program modules), and operating system.

The external computing entity 102 may also comprise a user interface (that may include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the authentication action request processing computing entity 106, as described herein. The user input interface may comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 may include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The external computing entity 102 may also include volatile storage or memory 322 and/or non-volatile storage or memory 324, which may be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the authentication action request processing computing entity 106 and/or various other computing entities.

In another embodiment, the external computing entity 102 may include one or more components or functionality that are the same or similar to those of authentication action request processing computing entity 106, as described in greater detail above. As will be recognized, these frameworks and descriptions are provided for exemplary purposes only and are not limiting to the various embodiments. For example, the external computing entity 102 may comprise the authentication action request processing computing entity 106, or a portion thereof. Alternatively, the authentication action request processing computing entity 106 may comprise the external computing entity 102, or a portion thereof. In some embodiments, the external computing entity 102 may be a user device associated with a particular user, a plurality of users, and/or a collection of user devices with respective or the same associated user(s). As described hereafter, the external computing entity 102 (e.g., an example user device) may include a plurality of sensors, sensing device, cameras, imagers, microphones, accelerometers, gyroscopes, thermometers, and/or any sensing device based upon the intended application of the embodiments described herein.

In various embodiments, the external computing entity 102 may be embodied as an artificial intelligence (AI) computing entity. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Although illustrated as separate entities, the present disclosure contemplates that the components illustrated and described with reference to FIG. 2 may, in some embodiments, be housed in whole or in part in the external computing entity 102. Similarly, the present disclosure contemplates that the components illustrated and described with reference to FIG. 3 may, in some embodiments, be housed in whole or in part in the authentication action request processing system 101, the authentication action request processing computing entity 106, or any other entity not expressly illustrated in FIGS. 1-3. Said differently, the user interface presenting authentication action responses generated by the operations described hereafter may be presented by the authentication action request processing system 101, the authentication action request processing computing entity 106, the external computing entity 102, or any other entity not expressly illustrated in FIGS. 1-3.

Figure 4:
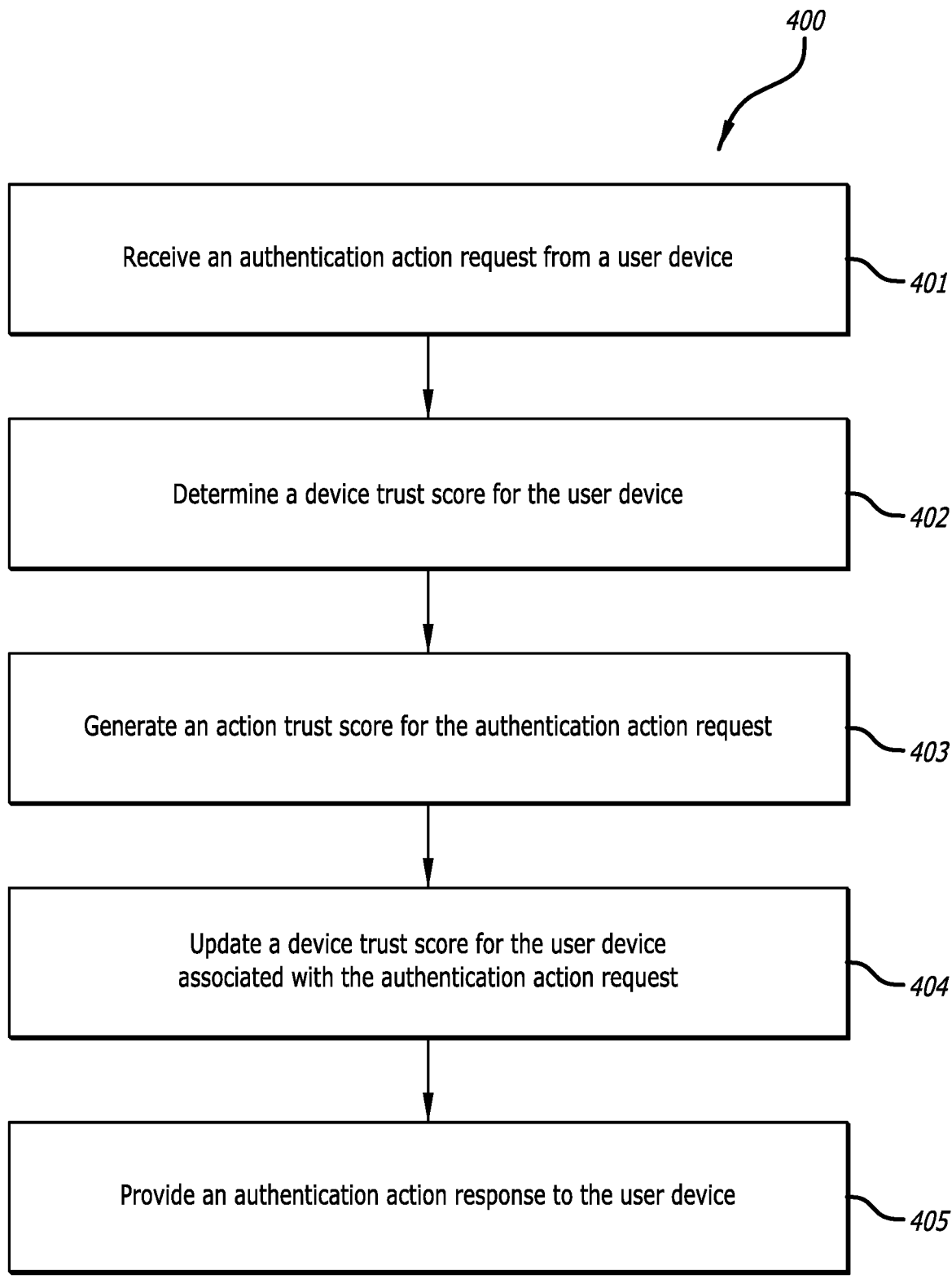
FIG. 4 illustrates an example flowchart for determining a trust score for an authentication action request in accordance with some example embodiments described herein.

Exemplary Operations for Determining a Trust Score for an Authentication Action Request FIG. 4 illustrates a flowchart containing a series of operations 400 for determining a trust score for an authentication action request. The operations 400 illustrated in FIG. 4 may, for example, be performed by, with the assistance of, and/or under the control of an apparatus (e.g., authentication action request processing computing entity 106), as described above. In this regard, performance of the operations may invoke one or more of processing element 205, volatile memory 215, non-volatile memory 210, and/or network interface 220.

As shown in operation 401, the apparatus (e.g., authentication action request processing computing entity 106) includes means, such as processing element 205, volatile memory 215, volatile memory 210, network interface 220, and/or the like, for receiving an authentication action request from an external computing entity 102, such as from a user device associated with a user. As defined above, an authentication action request may refer to an electronically received data object associated with a request from a user to perform one or more events, services, actions, functions, operations, and/or the like for a corresponding user account. Each authentication action request may correspond to an authentication action request type from amongst a plurality of candidate authentication action request types.

For example, candidate authentication action request types may include a request to transfer funds to and/or from one or more financial accounts, change a password associated with a user account, open a new account for the user, check the status of one or more accounts, and/or the like. In some embodiments, the authentication action request may include authentication action metadata and a user identifier. The user identifier may be any identifier which identifies a user associated with the authentication action request. For example, a user identifier may include a username, account number, phone number, email address, customer identifier, and/or the like. The authentication action request metadata may include one or more attributes describing any data associated with the requesting user, user device, and/or authentication request. For example, the authentication action request metadata may describe attributes including one or more of event data, user device information, location data, user biometric data, user device interaction information, and/or the like.

In some embodiments, event data may include a date and/or time associated with the authentication action request. Event data may additionally or alternatively include an authentication action request type associated with the authentication action request. Each authentication action request type may correspond to an authentication action request type of a plurality of candidate authentication action request types. For example, candidate authentication action request types may include a request to login to a user account, transfer funds to and/or from one or more financial accounts, change a password associated with a user account, open a new account for the user, check the status of one or more financial accounts, and/or the like.

In some embodiments, user device information may include user device information such as a user device identifier, user device type (e.g., cell phone, laptop, desktop computer, tablet, etc.), operating system (OS) version, OS name, user device manufacturer, user device model, user device model number, user device service provider, user device feature enablement (e.g., camera enabled, wallet enabled, etc.), one or more auxiliary device identifiers (e.g., Bluetooth connected devices, etc.), the connection status of the one or more auxiliary devices, authenticator used, an indication of whether the device has been authenticated by one or more methods (e.g., authenticated by email, short message service (SMS) text, phone call, etc.) and/or the like. Furthermore, a user device identifier may include any suitable identifier which uniquely identifies the user device. For example, a user device identifier may describe a media access control (MAC) address, international mobile equipment identity (IMEI), international mobile subscriber identity (IMSI), integrated circuit card identifier (ICCID or subscriber identifier module card identifier), phone number, a device name, common device identifier, and/or the like.

In some embodiments, location information may describe the geographic region within which the user device transmits the authentication action request. In some embodiments, the geographic region corresponds to one or more geographic hierarchical levels. For example, a geographic region hierarchical level may include a country location level, state location level, zip code location level, address location level, and/or the like. In some embodiments, the user device location information may describe an internet protocol (IP) address and/or IP location for the user device associated with the authentication action request and/or one or more proxy user devices. This location information may be available for a plurality of external computing entities 102 (e.g., a plurality of user devices), each of which may be associated with the requesting user or another user physically located proximate the requesting user, designated as a trusted user/user device by the requesting user, and/or the like.

In some embodiments, user biometric data may include user fingerprint data, face scan data, retina scan data, vocal pattern data, gesture data, input pressure, movement data, and/or the like. In some embodiments, user device interaction information may include data describing the way an end user interacts with the device. For example, user device interaction information may include user swiping patterns, user keystroke patterns, user orientation patterns (e.g., how the user holds a mobile device), and/or the like. In some embodiments, user device interaction information may be derived from other data sources.

By way of example, FIGS. 5A-5B depict operational examples of authentication action request metadata in accordance with some embodiments. As shown in FIGS. 5A-5B, authentication action request metadata 500 and 500' describe various attributes pertaining to the authentication action request, the user device providing the authentication action request, the user associated with the user device, and/or the interaction between the user device and the user.

Thereafter, as shown in operation 402, the apparatus (e.g., authentication action request processing computing entity 106 and/or device trust score engine 114) includes means, such as processing element 205, volatile memory 215, non-volatile memory 210, and/or the like, for determining a device trust score for the user device which transmitted the authentication action request as received in operation 401. In some embodiments, a device trust score may be indicative of the probability the user device is trusted by the authentication action request processing computing entity 106. In some embodiments, the device trust score is numerical. In some embodiments, the device trust score may be classified into a particular device trust score classification category. The device trust score classifications categories may include, but are not limited to, a high device trust classification, a medium device trust classification, and a low device trust classification. By way of a nonlimiting example, each classification category may be defined by one or more device trust scores. For example, a low device trust classification category may be defined by device trust scores between 0-20, a medium device trust classification category may be defined by device trust scores between 21-80, and a high device trust classification category may be defined by trust device scores between 81-100. In some embodiments, operation 402 may be performed in accordance with the various operations of the process 700 depicted in FIG. 7 and described hereafter.

Thereafter, as shown in operation 403, the apparatus (e.g., authentication action request processing computing entity 106 and/or action trust score engine 112), includes means, such as processing element 205, action trust score engine 112, and/or the like, for generating an action trust score for the authentication action request. In some embodiments, an action trust score may be generated using an action trust score machine learning model. An action trust score machine learning model may be configured to describe parameters, hyper-parameters, and/or stored operations of a machine learning model that is configured to generate a trust score for a received authentication action request. In some embodiments, the action trust score machine learning model may be configured to process a device trust score and/or authentication action request to generate a trust score for the authentication action request. In some embodiments, a trust score may be any numeric value. In some embodiments, the action trust score machine learning model may be configured to determine one or more trust score classifications for the trust score. The trust score classifications categories may include, but are not limited to, a high trust classification, a medium trust classification, and a low trust classification. Each classification category may be defined by one or more trust scores. For example, a low trust classification category may be defined by trust scores between 0-20, a medium trust classification category may be defined by trust scores between 21-80, and a high trust classification category may be defined by trust scores between 81-100.

In some embodiments, the action trust score machine learning model may employ any suitable clustering algorithms including but not limited to affinity propagation, agglomerative clustering, balanced iterative reducing and clustering using hierarchies (BIRCH), density-based spatial clustering of applications with noise (DBSCAN), k-means, mini-batch k-means, mean shift, ordering points to identify cluster structure (OPTICS), spectral clustering, mixture of Gaussians, and/or the like to generate the trust score for the authentication action request. In some embodiments, the action trust score machine learning model may cluster one or more authentication action request metadata attributes with one or more historical authentication action request metadata attributes. In some embodiments, the trust score may be based at least in part on inter-cluster distance between two or more clusters for a particular metadata attribute. For example, one cluster may correspond to a current keystroke pattern and another cluster may correspond to a historical average keystroke pattern, wherein the historical average keystroke pattern is the averaged keystroke pattern based at least in part on one or more historical authentication action requests. Additionally or alternatively, one cluster may correspond to a current keystroke pattern and one or more clusters may correspond to one or more historic keystroke patterns each corresponding to a particular historical authentication action request. In such an embodiment, the trust score may be based at least in part on the inter-cluster distance between each of the cluster associated with the current authentication action request and the one or more clusters associated with the one or more historic authentication action requests. In some embodiments, each inter-cluster score for one or more attributes of the authentication action request may be used to generate the trust score. In some embodiments, the action trust score machine learning model may be further configured to determine weights for each of the inter-cluster scores to generate the trust score for the authentication action request. In some embodiments, the one or more action trust score machine learning models may be trained to determine or to otherwise derive an optimal configuration and/or to optimize one or more associated hyper-parameters. In some embodiments, the parameters and/or hyper-parameters of the action trust score machine learning generation model may be represented as one or more values, such as in an array.

Thereafter, as shown in operation 404, the apparatus (e.g., authentication action request processing computing entity 106 and/or device trust score engine 114) includes means, such as processing element 205, network interface 220, and/or the like, for updating a device trust score for the user device (e.g., external computing entity 102) associated with the authentication action request. In some embodiments, the trust score for the user device associated with the authentication action request may be updated based at least in part on the trust score for the authentication action request and/or the authentication action request metadata. In some embodiments, the device trust score may be updated using the device trust score machine learning model. The device trust score machine learning model may be configured to process the generated trust score for the authentication action request and the authentication action request metadata to update the trust score associated with the user device. For example, if the trust score associated with the authentication action request is high, the device trust score machine learning model may increase the device trust score.

In some embodiments, if the authentication action request metadata is similar to historical authentication action request metadata and/or data associated with the user profile, the device trust score machine learning model may increase the device trust score. The similarity between authentication action request metadata and historical authentication action request metadata and/or data associated with the user profile may be determined based at least in part on one or more clustering techniques. In some embodiments, the action trust score machine learning model may be further configured to update the device trust score based at least in part on a trust score for the corresponding authentication action request and/or authentication action request metadata. In some embodiments, the device trust score machine learning model may employ any suitable clustering algorithms including but not limited to affinity propagation, agglomerative clustering, balanced iterative reducing and clustering using hierarchies (BIRCH), density-based spatial clustering of applications with noise (DBSCAN), k-means, mini-batch k-means, mean shift, ordering points to identify cluster structure (OPTICS), spectral clustering, mixture of Gaussians, and/or the like. In some embodiments, the device trust score machine learning model may cluster one or more authentication action request metadata device attributes with one or more historical authentication action request metadata device attributes. In some embodiments, the device trust score may be based at least in part on inter-cluster distance between two or more clusters for a particular metadata device attribute. For example, one cluster may correspond to a location and one or more clusters may correspond to one or more historic location each corresponding to a particular historical authentication action request. In such an embodiment, the device trust score may be based at least in part on the inter-cluster distance between each of the cluster associated with the current authentication action request and the one or more clusters associated with the one or more historic authentication action requests. In some embodiments, each inter-cluster score for one or more device attributes of the authentication action request may be used to generate the device trust score. In some embodiments, the device trust score machine learning model may be further configured to determine weights for each of the inter-cluster scores to generate the device trust score for the authentication action request. In some embodiments, the one or more device trust score machine learning models may be trained to determine or to otherwise derive an optimal configuration and/or to optimize one or more associated hyper-parameters. In some embodiments, the parameters and/or hyper-parameters of the device trust score machine learning generation model may be represented as one or more values, such as in an array.

Thereafter, as shown in operation 405, the apparatus (e.g., authentication action request processing computing entity 106) includes means, such as processing element 205, network interface 220, for providing the authentication action response to the user device (e.g., example external computing entity 102). In some embodiments, the authentication action request processing computing entity 106 may be configured to generate an authentication action response based at least in part on the trust score for the authentication action request. The authentication action response may be indicative of whether the authentication action request was successful. In some embodiments, the authentication action response may further include instructions for completing or performing one or more next steps, operations, functions, and/or the like associated with the authentication action request. In some embodiments, the one or more next steps may be defined based at least in part on an authentication action flow. In some embodiments, operation 405 may be performed in accordance with the various operations of the process 1000 depicted in FIG. 10.

Figure 6A:
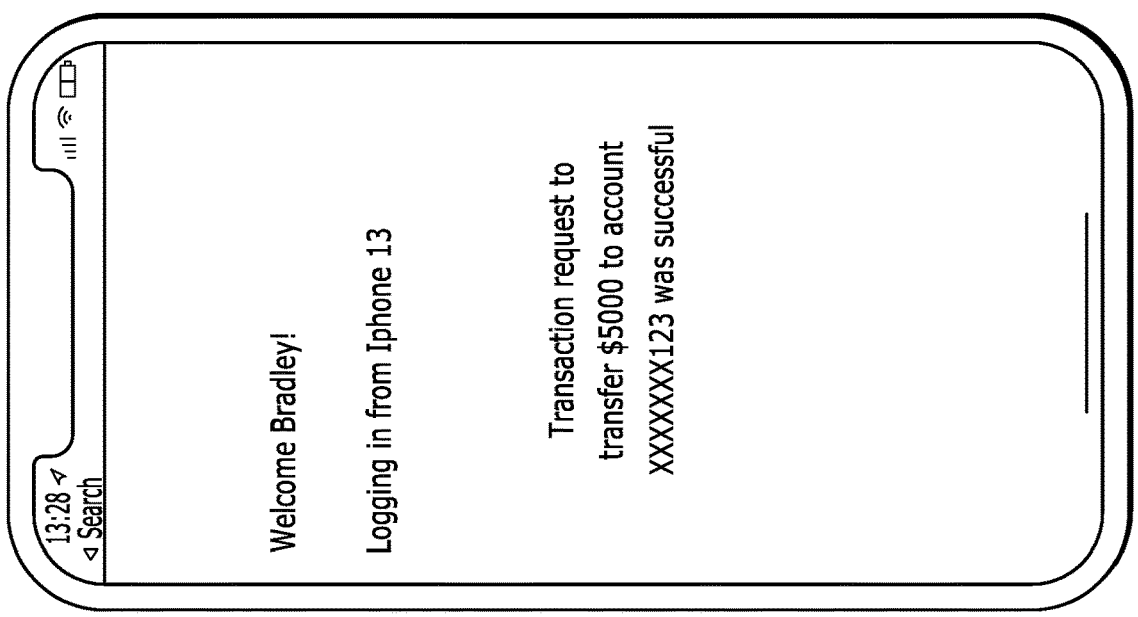
FIGS. 6A-6B illustrate operational examples of authentication action responses in accordance with some example embodiments described herein.
Figure 6B:
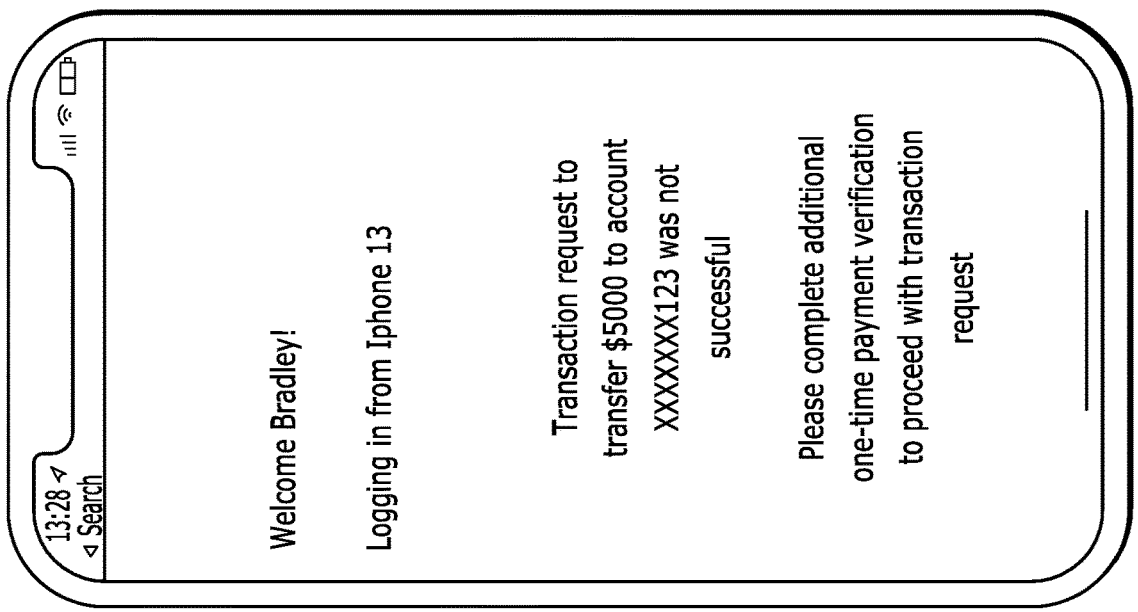

By way of example, FIGS. 6A-6B depict operational examples of an authentication action response in accordance with some embodiments. As shown in FIGS. 6A-6B, an authentication action response 600 may be provided to a user device and describe whether the authentication action request was successful. In the example embodiment of FIG. 6A, the authentication action response indicates the transaction request (i.e., authentication action request) to transfer 5000 dollars to an account XXXXXXX123 was successful. In the example embodiment of FIG. 6B, the authentication action response 600' indicates the transaction request (i.e., authentication action request) to transfer 5000 dollars to an account XXXXXXX123 was not successful and further, requests an additional action to process the authentication action request. The authentication action response further indicates information including the name of the user associated with the authentication action response and the user device identifier associated with the authentication action response.

Figure 7:
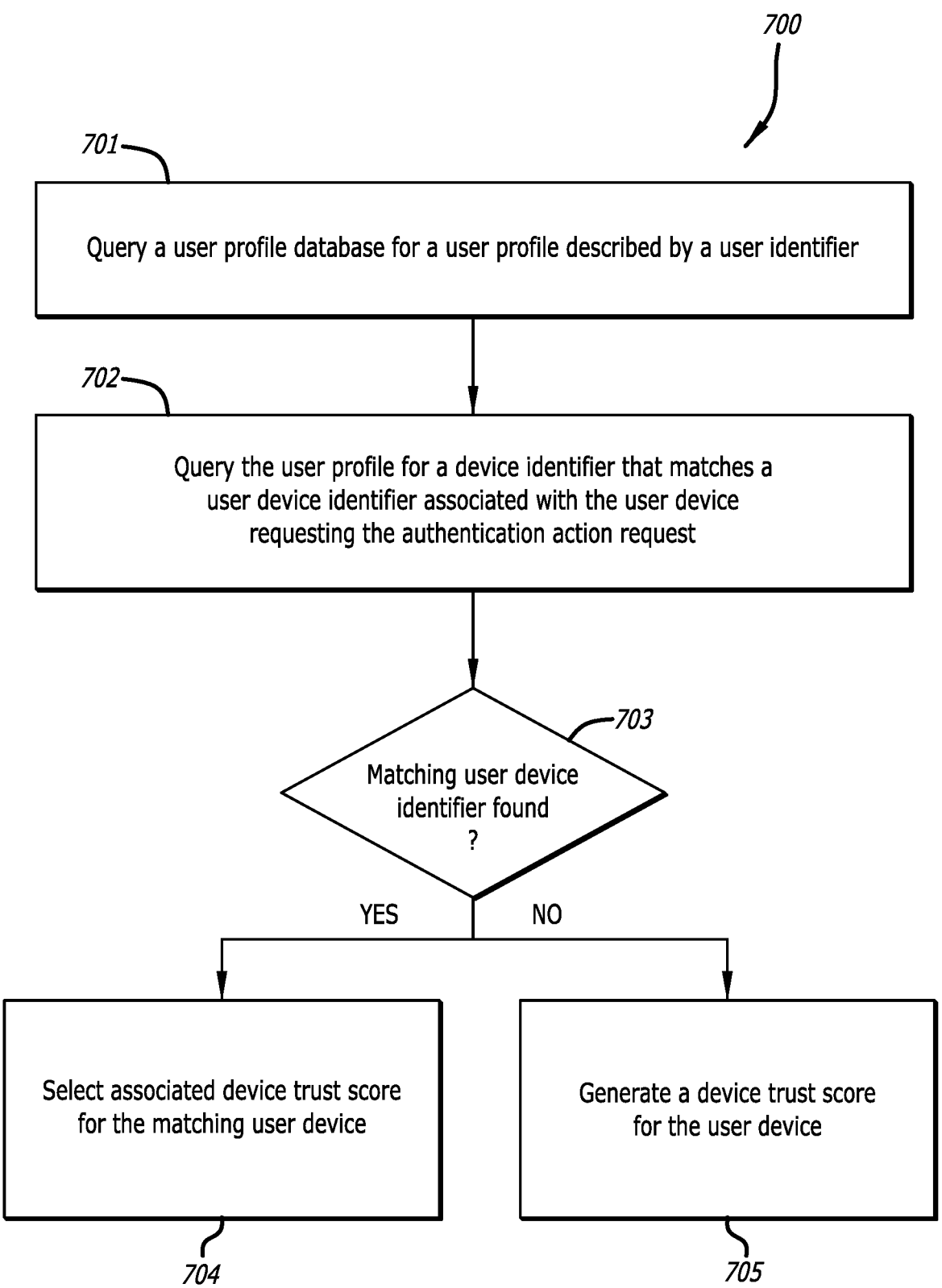
FIG. 7 illustrates an example flowchart for determining a device trust score in accordance with some example embodiments described herein.

Turning next to FIG. 7, a flowchart is shown for determining a trust score associated with a user device. The operations illustrated in FIG. 7 may, for example, be performed by, with the assistance of, and/or under the control of an apparatus (e.g., authentication action request processing computing entity 106), as described above. In this regard, performance of the operations may invoke one or more of processing element 205, volatile memory 215, non-volatile memory 210, and/or network interface 220.

As shown in operation 701, the apparatus (e.g., authentication action request processing computing entity 106) includes means, such as processing element 205, volatile memory 215, non-volatile memory 210, or the like, for querying a user profile database for a user profile described by a user identifier. In some embodiments, a user profile database may include one or more user profiles. The user profile database may be stored locally, such as in storage subsystem 108 and/or alternatively, may store at least a portion of the user profile database in one or more external computing entities 102 (e.g., example user devices or the like). A user profile may be associated with a particular user and may be identified by a unique user profile identifier. For example, a unique user profile identifier may be used to uniquely identify and/or distinguish one or more user profiles from one another. For example, a user identifier may include a username, account number, phone number, email address, customer identifier, and/or the like. A user profile may store user information including, but not limited to, a username, one or more associated user accounts, one or more historical event data objects, and/or one or more user devices. The one or more historical event data objects may include one or more historical authentication action requests, associated authentication action request metadata, an associated device trust score, a determined trust score for the historical authentication action request, and/or the like. Each of the one or more user devices stored within the user account may contain be associated with a device profile as will be discussed in greater detail in operation 702.

In some embodiments, the one or more historical event data objects may be used at least in part to generate one or more attributes for the particular user and/or the particular user device. For example, the authentication action request processing computing entity 106 may perform one or more mathematical operations on the one or more historical event data objects to determine one or more attributes for the user. For example, a particular attribute from each of the one or more historical event data objects may be clustered together.

Furthermore, in some embodiments, each user device associated with the user profile may have an associated user device profile. The user device profile may describe one or more events, authentication action requests, authentication action responses, and/or the like pertaining to the user device.

Figure 8:
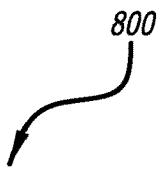
FIG. 8 illustrates an operational example of one or more user devices associated with a user profile in accordance with some example embodiments described herein.

By way of example, FIG. 8 depicts an operational example of a user profile in accordance with some embodiments. As shown in FIG. 8, a user profile 800 may describe one or more devices associated with the particular user. For example, as depicted in FIG. 8, the user profile corresponds to a user "Bradley". The one or more devices may be described by a unique user device identifier and may also correspond to a user device name. The user device name may be based at least in part on the type of corresponding user device and/or may be determined based at least in part on user input. The user profile may further describe a data and/or time the user device was last seen by the authentication action request processing computing entity 106. In some embodiments, the user profile may further describe the current trust level associated with the user device.

Figure 9:
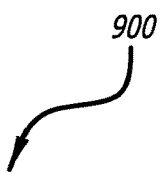
FIG. 9 illustrates an operational example of a user device profile associated with a particular user device in accordance with some example embodiments described herein.

FIG. 9 depicts an operational example of a user device profile in accordance with some embodiments. As shown in FIG. 9, a user device profile 900 may describe one or more events, authentication action requests, authentication action responses, and/or the like pertaining to the user device associated with the particular user device. For example, an email event on Jan. 1, 2020 may be associated with the "iPhone 13" user device associated with the user profile "Bradley" as described in FIG. 8 and the email event was authenticated.

Thereafter, as shown in operation 702, the apparatus (e.g., authentication action request processing computing entity 106) includes means, such as processing element 205, volatile memory 215, non-volatile memory 210, or the like, for querying the user profile for a device identifier that matches a user device identifier associated with the user device requesting the authentication action request. Once the user profile corresponding to the particular user is identified, the authentication action request processing computing entity 106 may further query the user profile for the user device matching the user device identifier associated with the user device requesting the authentication action request. The user device identifier may include any suitable identifier which uniquely identifies the user device. For example, a user device identifier may describe a media access control (MAC) address, international mobile equipment identity (IMEI), international mobile subscriber identity (IMSI), integrated circuit card identifier (ICCID or subscriber identifier module card identifier), phone number, a device name, common device identifier, and/or the like. As described above, in some embodiments, additional external computing entities 102 (e.g., other user devices) may be leveraged that are associated with the same or different end users. As such, the user profiles described herein may similarly list, detail, or otherwise interact with these other external computing entities 102.

Thereafter, as shown in operation 703, the apparatus (e.g., authentication action request processing computing entity 106) includes means, such as processing element 205, volatile memory 215, non-volatile memory 210, or the like, for determining whether a matching user device is found within the user profile. In an instance the matching user device is found within the user profile, the authentication action request processing computing entity 106 may proceed to operation 704. In an instance the matching user device is not found within the user profile, the authentication action request processing computing entity 106 may proceed to operation 705.

Thereafter, as shown in operation 704, in an instance a matching user device is found within the user profile, the apparatus (e.g., authentication action request processing computing entity 106) includes means, such as processing element 205, volatile memory 215, non-volatile memory 210, or the like, for selecting the associated device trust score for the matching user device as the device trust score. Upon selecting the user device that corresponds to the user device identifier associated with the authentication action request, the authentication action request processing computing entity 106 may select the device trust score associated with the particular user device. The selected device trust score may be the device trust score used when determining the device trust score with respect to operation 402 of FIG. 4.

Alternatively, as shown in operation 705, in an instance in which a matching user device is not found within the user profile, the apparatus (e.g., authentication action request processing computing entity 106 and/or device trust score engine 114) includes means, such as processing element 205, volatile memory 215, non-volatile memory 210, or the like, for generating a trust score for the user device. In an instance the authentication action request processing computing entity 106 is unable to determine a corresponding user device for the user device identifier associated with the authentication action request, the authentication action request processing computing entity 106 may generate a device profile for the user device and generate a device trust score for the user device. The authentication action request processing computing entity 106 may generate the user device profile based at least in part on the corresponding authentication action request metadata corresponding to the authentication action request.

In some embodiments, the authentication action request processing computing entity may use the device trust score engine 114 to generate a device trust score for the user device. The device trust score engine 114 may use a device trust score machine learning model to generate the device trust score. In some embodiments, the device trust score machine learning model may be configured to generate a device trust score based at least in part on authentication action request metadata and/or user data stored within the associated user profile. In some embodiments, the device trust score machine learning model may be configured to initialize a device trust score to an initial device trust score value. For example, the device trust score for a user device may be initialized to 10. The device trust score machine learning model may also be configured to modify the device trust score for the particular device in response to one or more authentication events, such as via email, short message service (SMS) message, phone call etc. The amount the device trust score is modified by may be a predetermined amount (e.g., 10 points for an affirmative email authentication event). Alternatively, the amount the device trust score is modified by may be determined automatically by the device trust score machine learning model. As such, the authentication action request processing computing entity 106 may be configured to select the generated device trust to be used as the device trust score used when determining the device trust score with respect to operation 402 of FIG. 4.

Figure 10:
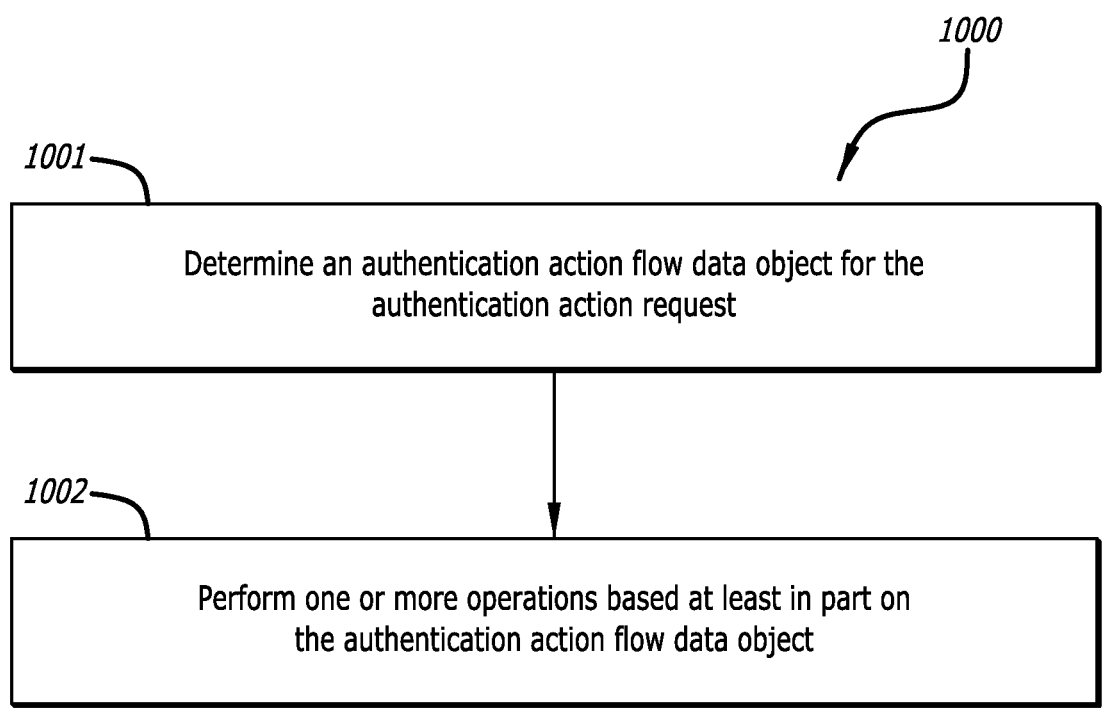
FIG. 10 illustrates an example flowchart for determining an authentication action flow data object in accordance with some example embodiments described herein.

Turning next to FIG. 10, a flowchart is shown for determining an authentication action flow data object for the authentication action request. The operations illustrated in FIG. 10 may, for example, be performed by, with the assistance of, and/or under the control of an apparatus (e.g., authentication action request processing computing entity 106), as described above. In this regard, performance of the operations may invoke one or more of processing element 205, volatile memory 215, non-volatile memory 210, and/or network interface 220.

As shown in operation 1001, the apparatus (e.g., authentication action request processing computing entity 106) includes means, such as processing element 205, volatile memory 215, non-volatile memory 210, or the like, for determining an authentication flow data object for the authentication action request. In some embodiments, an authentication flow data object describes one or more operations corresponding to a particular authentication action request type. In some embodiments, the authentication action flow data object may describe a decision tree model that can be used to determine one or more actions based at least in part on a device trust score for a requesting user device and/or trust score for a particular authentication action request. The authentication action flow data object may define a root-level node which is associated with authentication action request type. Each decision tree segment may be associated with a particular device trust score and/or trust score for the authentication action request. Each leaf-level node of the decision tree object may be associated with a particular set of actions corresponding to the authentication action request type of a plurality of candidate sets of actions. The authentication action request processing computing entity 106 may select the authentication flow data object from a plurality of candidate authentication flow data objects based at least in part on the authentication action request type indicated by the authentication action request.

Thereafter, as shown in operation 1002, the apparatus (e.g., authentication action request processing computing entity 106) includes means, such as processing element 205, volatile memory 215, non-volatile memory 210, or the like, for performing one or more operations based at least in part on the authentication action flow data object. The authentication action request processing computing entity 106 may traverse the authentication action flow data object based at least in part on the one or more trust score and perform the set of actions defined by the leaf-level node.

Figure 11:
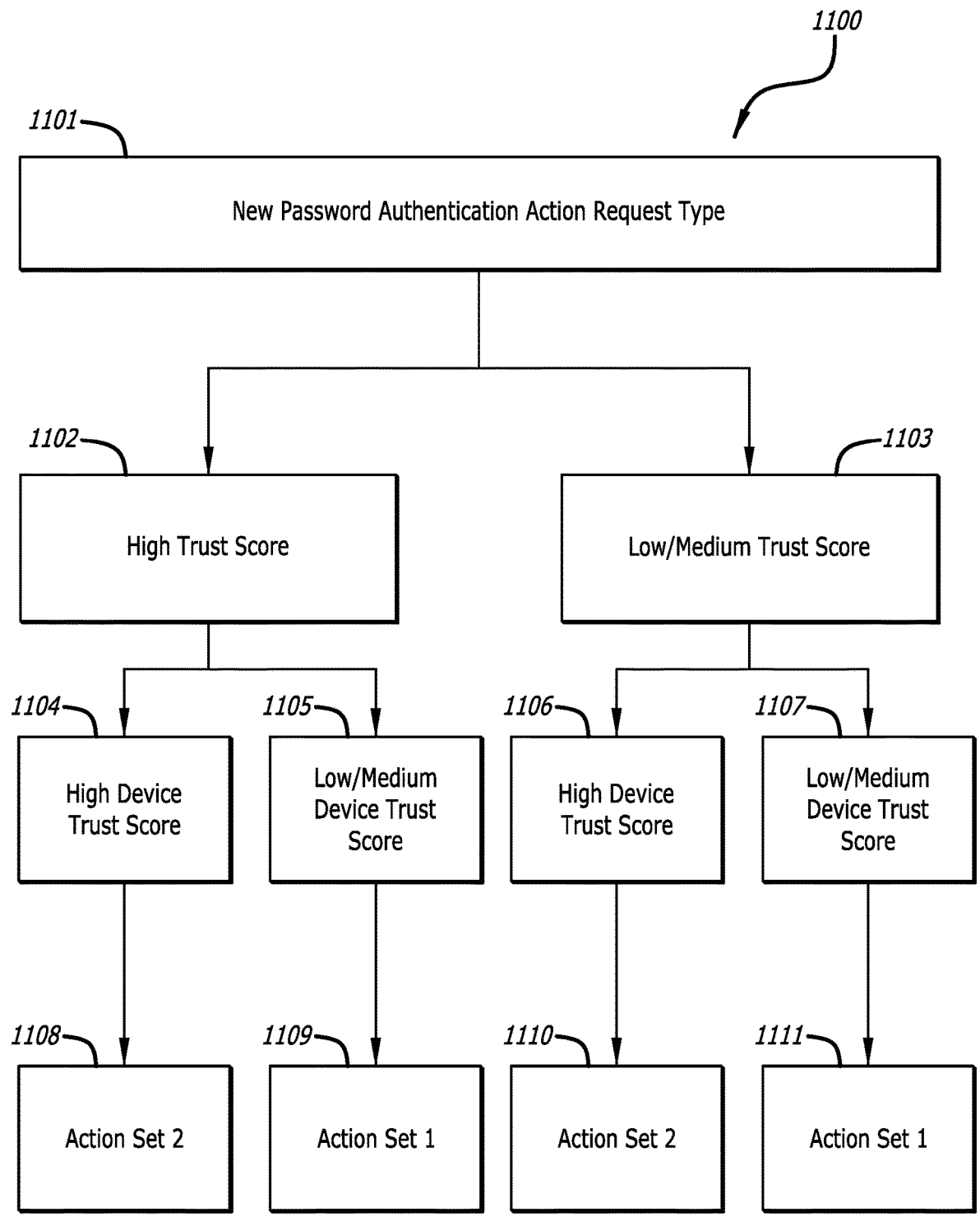
FIG. 11 illustrates an operational example of authentication action flow data object in accordance with some example embodiments described herein.

FIG. 11 depicts an operational example of an authentication action flow data object in accordance with some embodiments. As shown in FIG. 11, an authentication action flow data object may begin with a root-level node 1101 which is associated with authentication action request type. In the embodiment described by FIG. 11, the authentication action request type is a new password authentication request type. Each decision tree segment of the authentication action flow data object 1100 may be associated with a particular device trust score and/or trust score for the authentication action request. Here, the authentication action request processing computing entity 106 may traverse from the root-level node 1101 to either a high trust score decision tree segment 1102 or a low/medium trust score decision tree segment 1103 based at least in part on the determined trust score for the authentication action request. Similarly, depending on the particular traversed decision tree segment, the authentication action request processing computing entity may further traverse the decision tree to further decision tree segment, such as decision tree segments 1104-1107 based at least in part on the device trust score associated with the user device. The authentication action flow data object may be traversed until a leaf-level node of the authentication action flow data object is reached. Here, the leaf level nodes 1108-1111 each correspond to a particular set of actions corresponding to the authentication action request type of a plurality of candidate sets of actions.

Figures 12A, 12B:
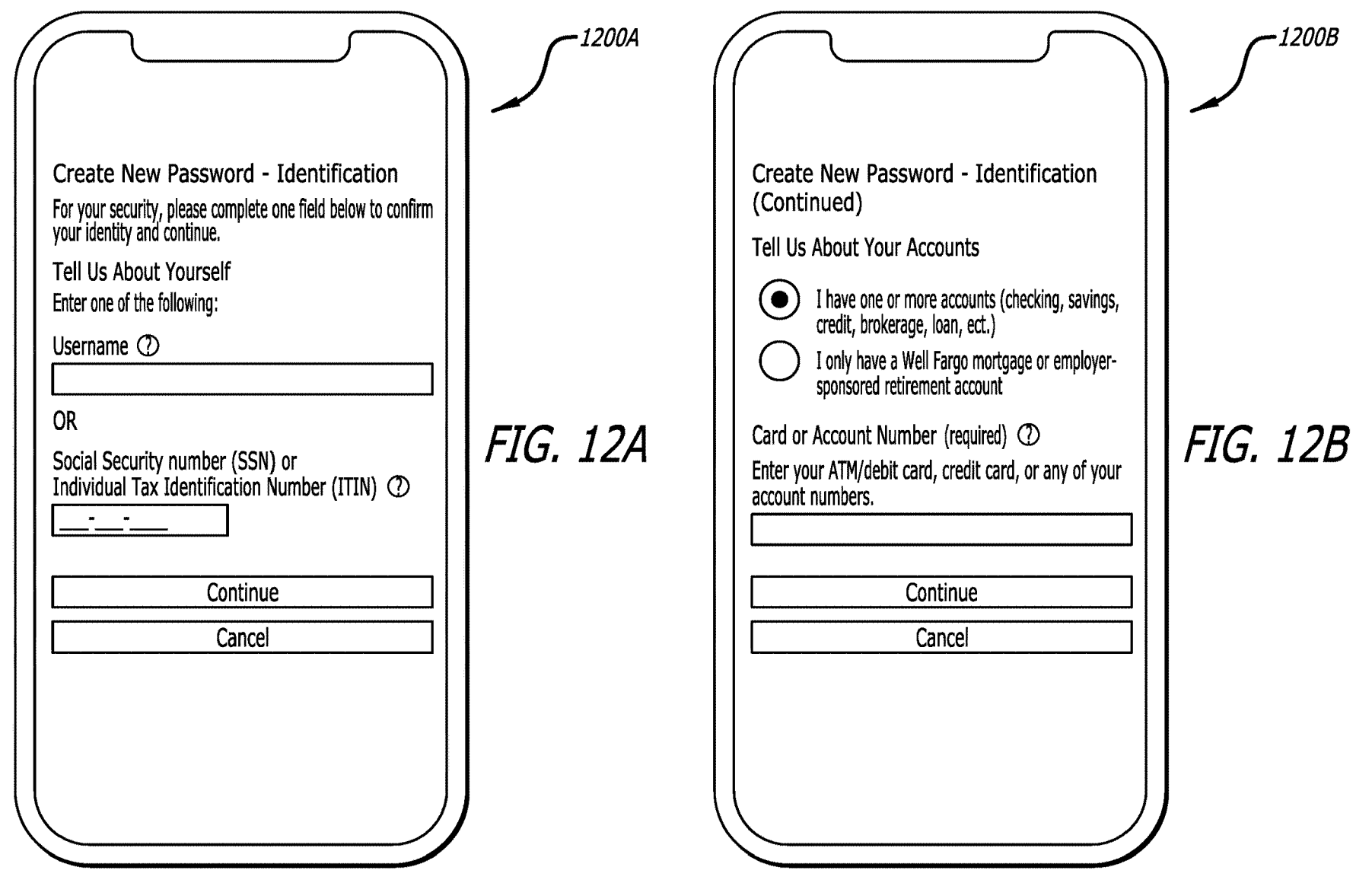
Figure 12C:
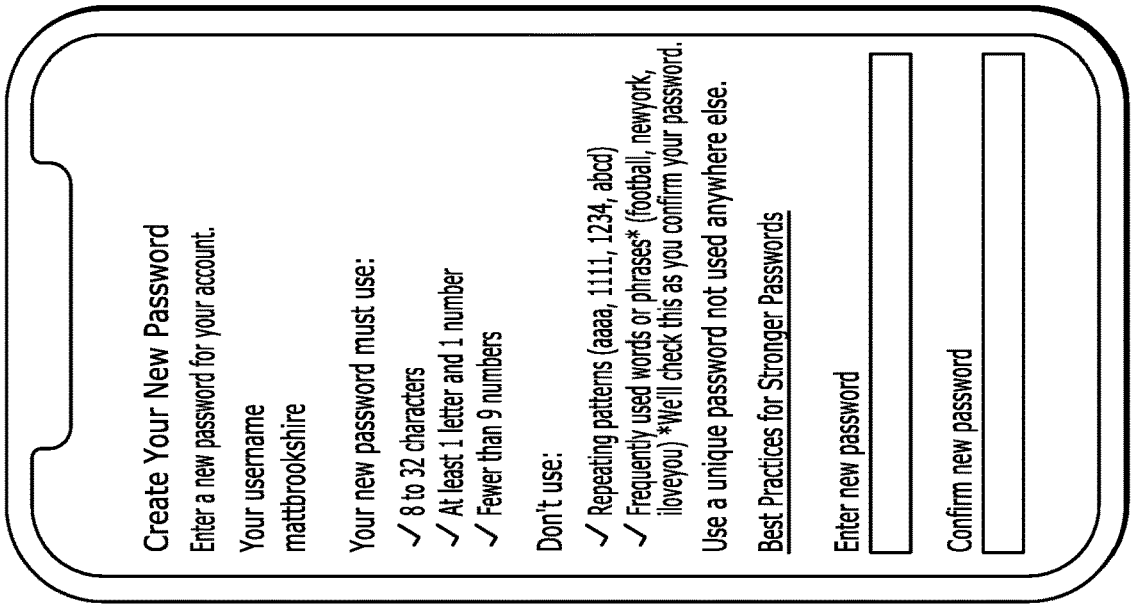
Figure 12D:
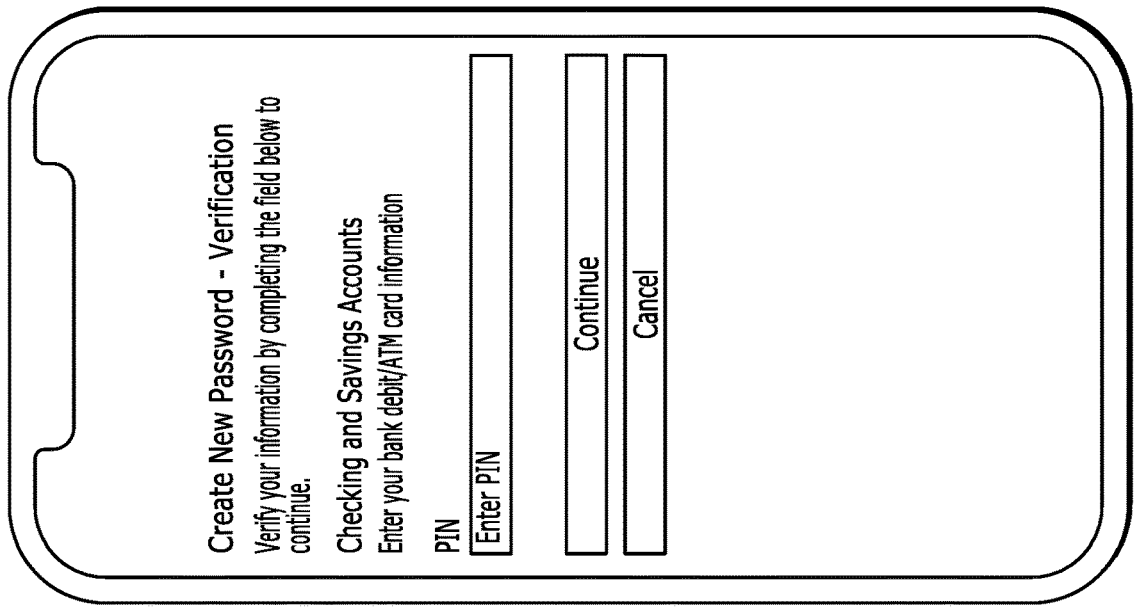

FIGS. 12A-12F depict an operational examples of two possible sets of actions in accordance with some embodiments. As shown in FIGS. 12A-12D, an authentication action flow data object may define a first set of actions 1200A-1200D corresponding to a new password generation authentication action request type. As shown in FIG. 12A, a series of actions corresponding to actions 1200A-1200D are labelled and include prompting a user to enter a social security number (SSN) and/or username associated with his/her account, entering a full account number, entering a PIN number, and then allowing the user to change his/her password. Referring back to FIG. 11, the leaf-level nodes 1109 and 1111 may describe the set of actions shown in FIGS. 12A-12D.

In comparison, FIGS. 12E-F show an authentication action flow data object may define a second set of actions 1200E-1200F corresponding to a new password generation authentication action request type. As shown in FIGS. 12E-12F, a series of actions corresponding to actions 1200E-1200F are labelled and include prompting a user to enter a social security number (SSN) and/or username associated with his/her account and then allowing the user to change his/her password. Although FIGS. 12A-12F are associated with a new password generation authentication action request type, the particular operations taken to perform the desired action are different and dependent upon the trust score for the authentication action request and/or the device trust score associated with the particular user device providing the authentication action request.

As described above, various technical challenges are surmounted via technical solutions contemplated herein. For instance, example implementations of embodiments of the present disclosure utilize authentication action request processing system that allows for the generation of a trust score for a particular authentication action request received from a user device. In operation, embodiments of the present disclosure may receive an authentication action request from a user device, determine a device trust score for the user device, and generate a trust score for the authentication action request based at least in part on the device trust score. An authentication action response may be provided to the user device based at least in part on the trust score for the authentication action request. The authentication action response may further execute one or more actions, operations, functions, services, and/or the like to satisfy the authentication action request using an authentication action flow data object and based at least in part on the trust score for the authentication action request and/or the device score for the associated user device. As such, an authentication action request may be satisfied using a set of actions that consider both how trusted a user device is as well as the type of authentication action request to determine a concise number of actions to satisfy the authentication action request while also maintaining user security, privacy, and confidentiality. In doing so, such example implementations confront and solve at least two technical challenges: (1) they provide a authentication action response which is dependent upon the authentication action request type, a trust score for the authentication action request, and a device trust score, and (2) they allow for a streamline processing and execution of a set of actions to satisfy the authentication action request, resulting in a more time efficient and less computationally resource-intensive methods to provide the authentication action response.

FIGS. 4, 7, and 10 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a storage subsystem 108 of the authentication action request processing system 101 and executed by an authentication action request processing computing entity 106 with an associated processing element 205 of the authentication action request processing system 101. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, may be implemented by special purpose hardware-based computer systems which perform the specified functions, or combinations of special purpose hardware with computer instructions.

CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method comprising:
    receiving, from a user device, an authentication action request, wherein the authentication action request comprises an authentication action request type, authentication action request metadata, and a user identifier;
    determining, using one or more processors and based on the authentication action request metadata, a device trust score associated with the user;
    generating, using the one or more processors and an action trust score machine learning model, a trust score for the authentication action request based on the authentication action request metadata;
    traversing, using the one or more processors, an authentication action flow data object using the device trust score and the trust score for the authentication action request to identify an action;
    performing, using the one or more processors, the action; and
    providing an authentication action response to the user device based at least in part on the trust score for the authentication action request, wherein the authentication action response comprises at least an indication of whether the authentication action request was successful.

2. The computer-implemented method according to claim 1, the computer-implemented method further comprising updating, using the one or more processors and a device trust score machine learning model, the device trust score for the user device associated with the authentication action request, wherein the device trust score is updated based at least in part on the trust score for the authentication action request.

3. The computer-implemented method according to claim 1, wherein determining the device trust score associated with the user device associated with the authentication action request further comprises:
    querying, using the one or more processors, a user profile database to retrieve a user profile identified by the user identifier;
    determining, using the one or more processors, whether the user profile includes a device identifier that matches the user identifier associated with the user device requesting the authentication action request;
    in response to determining the user profile includes the device identifier, selecting, using the one or more processors, the device trust score for the matching user device; and
    in response to determining the user profile does not include the device identifier, generating, using the one or more processors, the device trust score for the user device.

4. The computer-implemented method according to claim 1, wherein generating the trust score for the authentication action request further comprises:
    comparing, using the one or more processors, the authentication action request metadata to an attribute value stored in an attribute profile associated with a user profile described by the user identifier, wherein the trust score for the authentication action request is based on a similarity between the authentication action request metadata and the attribute value.

5. The computer-implemented method according to claim 1, wherein generating the trust score for the authentication action request is based on historical trust scores associated with the user device.

6. The computer-implemented method according to claim 1, wherein the authentication action request metadata comprises one or more of event data, user device information, location data, user biometric information, and user device interaction information.

7. The computer-implemented method of claim 1, further comprising determining, using the one or more processors, an inter-cluster distance between two or more clusters for a metadata attribute included in the authentication action request metadata, wherein the trust score for the authentication action request is generated based on the inter-cluster distance.

8. An apparatus comprising at least one processor and at least one memory, the at least one memory having computer-code instructions stored thereon that, in execution with the at least one processor, configure the apparatus to:
    receive, from a user device, an authentication action request, wherein the authentication action request comprises an authentication action request type, authentication action request metadata, and a user identifier;
    determine, based on the authentication action request metadata, a device trust score associated with the user device;
    generate, an action trust score machine learning model, a trust score for the authentication action request based on the authentication action request metadata;
    traverse an authentication action flow data object using the device trust score and the trust score for the authentication action request to identify an action;
    perform the action; and
    provide an authentication action response to the user device based at least in part on the trust score for the authentication action request, wherein the authentication action response comprises at least an indication of whether the authentication action request was successful.

9. The apparatus according to claim 8, wherein the apparatus is further configured to update, using a device trust score machine learning model, the device trust score for the user device associated with the authentication action request, wherein the device trust score is updated based on the trust score for the authentication action request.

10. The apparatus according to claim 8, wherein the apparatus, is further configured to:
   query a user profile database to retrieve a user profile identified by the user identifier;
   determine whether the user profile includes a device identifier that matches the user identifier associated with the user device requesting the authentication action request;
   in response to determining the user profile includes the device identifier, select the device trust score for the matching user device; and
   in response to determining the user profile does not include the device identifier, generate the device trust score for the user device.

11. The apparatus according to claim 8, wherein the apparatus is further configured to:
   compare the authentication action request metadata to an attribute value stored in an attribute profile associated with a user profile described by the user identifier, wherein the trust score for the authentication action request is based on a similarity between the authentication action request metadata and the attribute value.

12. The apparatus according to claim 8, wherein generating the trust score for the authentication action request is based on historical trust scores associated with the user device.

13. The apparatus according to claim 8, wherein the authentication action request metadata comprises one or more of event data, user device information, location data, user biometric information, and user device interaction information.

14. The apparatus of claim 8, wherein the apparatus is further configured to determine an inter-cluster distance between two or more clusters for a metadata attribute included in the authentication action request metadata, wherein the trust score for the authentication action request is generated based on the inter-cluster distance.

15. A computer program product comprising at least one non-transitory computer-readable storage medium storing software instructions that, when executed, cause an apparatus to:
   receive, from a user device, an authentication action request, wherein the authentication action request comprises an authentication action request type, authentication action request metadata, and a user identifier;
   determine, based on the authentication action request metadata, a device trust score associated with the user device;
   generate, using an action trust score machine learning model, a trust score for the authentication action request based on the authentication action request metadata;
   traverse an authentication action flow data object using the device trust score and the trust score for the authentication action request to identify an action;
   perform the action; and
   provide an authentication action response to the user device based at least in part on the trust score for the authentication action request, wherein the authentication action response comprises at least an indication of whether the authentication action request was successful.

16. The computer program product according to claim 15, wherein the software instructions, when executed, further cause the apparatus to:
   update, using a device trust score machine learning model, the device trust score for the user device associated with the authentication action request, wherein the device trust score is updated based on the trust score for the authentication action request.

17. The computer program product according to claim 15, wherein the software instructions, when executed, further cause the apparatus to:
   query a user profile database to retrieve a user profile identified by the user identifier;
   determine whether the user profile includes a device identifier that matches the user identifier associated with the user device requesting the authentication action request;
   in response to determining the user profile includes the device identifier, select the device trust score for the matching user device; and
   in response to determining the user profile does not include the device identifier, generate the device trust score for the user device.

18. The computer program product according to claim 15, wherein the software instructions, when executed, further cause the apparatus to compare the authentication action request metadata to an attribute value in an attribute profile associated with a user profile described by the user identifier, wherein the trust score for the authentication action request is based on a similarity between the authentication action request metadata and the attribute value.

19. The computer program product according to claim 15, wherein the authentication action request metadata comprises one or more of event data, user device information, location data, user biometric information, and user device interaction information.

20. The computer program product of claim 15, wherein the software instructions, when executed, further cause the apparatus to determine an inter-cluster distance between two or more clusters for a metadata attribute included in the authentication action request metadata, wherein the trust score for the authentication action request is generated based on the inter-cluster distance.

* * * * *

UNITED STATES PATENT AND TRADEMARK OFFICE
CERTIFICATE OF CORRECTION

PATENT NO. : 12,475,207 B1
APPLICATION NO. : 18/054357
DATED : November 18, 2025
INVENTOR(S) : William Blakely Belchee et al.

Page 1 of 1

It is certified that error appears in the above-identified patent and that said Letters Patent is hereby corrected as shown below:

In the Claims

In Column 27, Line 36 (Claim 1), after "with the user", please insert --device--.

In Column 27, Lines 58-59 (Claim 2), delete "at least in part".

Signed and Sealed this
Sixth Day of January, 2026

John A. Squires
*Director of the United States Patent and Trademark Office*